(12) United States Patent
Bruning et al.

(10) Patent No.: US 6,315,931 B1
(45) Date of Patent: Nov. 13, 2001

(54) METHOD OF PRODUCING A FOAMED GRANULATE

(75) Inventors: Juergen Bruning, Werther; Otto Deseke, Lehrte; Joachim Meyke, Friedrichroda, all of (DE)

(73) Assignee: Gefinex Polymerschaeume GmbH, Steinhagen (DE)

( * ) Notice: Subject to any disclaimer, the term of this patent is extended or adjusted under 35 U.S.C. 154(b) by 0 days.

(21) Appl. No.: 09/367,591

(22) PCT Filed: Dec. 15, 1998

(86) PCT No.: PCT/DE98/03692

§ 371 Date: Nov. 5, 1999

§ 102(e) Date: Nov. 5, 1999

(87) PCT Pub. No.: WO99/32271

PCT Pub. Date: Jul. 1, 1999

(30) Foreign Application Priority Data

Dec. 18, 1997 (DE) .............................................. 197 56 264

(51) Int. Cl.[7] .................................................... B29D 67/00
(52) U.S. Cl. ............................ 264/53; 264/142; 264/143; 521/79; 521/917
(58) Field of Search ............................ 264/53, 142, 143; 521/79, 917

(56) References Cited

U.S. PATENT DOCUMENTS 4,606,873 * 8/1986 Biglione et al. ....................... 264/53
5,091,126 * 2/1992 Weber et al. ......................... 521/79

FOREIGN PATENT DOCUMENTS

19547398 * 12/1995 (DE) .

* cited by examiner

*Primary Examiner*—Morton Foelak
(74) *Attorney, Agent, or Firm*—Crowell & Moring LLP

(57) ABSTRACT

A method for producing a foamed granulate, wherein a thermoplastic synthetic material is placed in an extruder, the synthetic material is melted, a pressurized expanding agent is fed through one or several injection nozzles, the molten material enriched with the expanding medium is foamed as it exits through a perforated plate arranged at the outlet of the extruder and is granulated by a cutting device arranged behind the perforated plate. Also disclosed is a device for implementing the method and the foamed granulate. The invention is characterized in that the molten material is cooled in a controlled manner as it comes out of the perforated plate and exits directly into a flowing cooling medium, in that the temperature of the molten material and the temperature and pressure of the cooling medium are regulated in such a way that once the molten material exits the perforated plate, the surface of the molten material is directly hardened into a closed film with a smooth surface having a thickness that ranges from 10 to 500 $\mu$m, preferably 20 to 200 $\mu$m, whereupon the molten material is foamed and a granulate with a rounded surface and a bulk density of 10 to 600 g/l is formed. A semi-spherical granulate with a smooth surface is thus obtained.

9 Claims, No Drawings

METHOD OF PRODUCING A FOAMED GRANULATE

The invention relates to a method for producing a foamed granulate, wherein a thermoplastic synthetic material is placed in an extruder, the synthetic material is melted, and a pressurized expanding agent is fed through one or several injection nozzles and the molten material enriched with the expanding agent is foamed as it exits through a perforate plate arranged at the outlet of the extruder and is granulated by a cutting machine arranged behind the perforate plate.

Foamed granulates are used for producing molded parts which have a foamed structure. Packaging or the inner parts of motor vehicles are examples within this context. It is generally desirable that the foamed granulate have a rounded, if possible spherical, shape which facilitates the transportation and the introduction of the granulate into the molds.

Having the molten material of a thermoplastic synthetic material which has been enriched with an expanding agent foam as it exits into the atmosphere through a perforated plate has already been disclosed. A granulation then ensues the material is foamed simultaneously in the atmosphere by means of a water-ring granulating machine arranged behind the perforated plate. It is disadvantageous at this point that the granulate has a surface full of crater-shaped fissures. These asperities are disadvantageous during the filling of the olds which is necessary for producing molded parts.

A method in which a foaming of the molten material is hindered by extruding the cord directly in a water bath through a nozzle located above the surface of the water and by cooling said cords at temperatures below the softening point has already been disclosed in DE 39 25 740 A1. The granulation of the unfoamed cords occurs here later in another machining operation, in which an expandable granulate with a square-edged surface is produced.

Producing a spherical granulate by extruding the molten material in an underwater granulating machine is also known from DE 195 47 398 In this case, however, it is necessary that the granulate be placed in a second procedure step in a compression-proof reactor and enriched with an expanding agent. The foaming of the granulate then ensues as the pressure in the reactor decreases. The fact that the production of a foamed granulate ensues in two complicated processing steps is disadvantageous in this procedure.

EP 0 411 437 has already disclosed the act of adding the expanding agent to a polymer in the extruder, whereby the molten material then is extruded in a coolant, in the process of which, however, a foaming is explicitly avoided. The foaming ensues in a subsequent working cycle while pressing the granulate to a plate associated with a subsequent reduction in pressure.

The basis of the present invention is to avoid the noted disadvantages and to produce a fine-grained granulate with a closed and rounded surface in a single operational step.

The objects of the invention are achieved by the invention as described and claimed hereinafter.

Because the molten material exits through the perforate plate, which is cooled in a controlled manner, into a flowing cooling medium and because the temperature of the molten material, the temperature of the cooling medium, as well as the pressure in the cooling medium are regulated accordingly so that the surface of the molten material immediately solidifies into a smooth-surfaced, closed film having a thickness of 10 to 500 $\mu$m, and preferably 20 to 200 $\mu$m, under which the molten material is foamed, the development of a granulate with an advantageously rounded surface and an ideal bulk density of 10 to 600 g/l is attained in a single procedure step. Toward this end, it is only necessary to use the extruder with a device for the direct injection of an expanding agent and with a perforated plate which is arranged at the extruder outlet and which connects to a granulating machine, in connection with which a flowing cooling medium into which the molten material directly escapes is active behind the perforated plate.

In accordance with a preferred embodiment of the invention, the molten material escapes the perforated plate into the flowing water of an underwater granulating machine. In addition to a regulated cooling, the flowing water of the granulating machine effects a secure conveyance of the granulate such that a bonding cannot occur.

A propylene is preferably introduced into the extruder as a thermoplastic synthetic material. The temperature of the cooling medium then lies at 20° to 80° C., the temperature of the molten material amounts to 190° to 210° C. as it exits the perforated plate, and a pressure of 1 bar is active in the vicinity of the coolant. The temperature of the molten material can lie between 100° to 300° C., preferably 160° to 280° C., if other materials are being processed. It has been observed that a closed, elastic film with a smooth surface is immediately formed on the surface of the molten material as it leaves the perforated plate. The molten material foaming underneath said film effects an elastic deformation of the film, wherein a granulate with a rounded, semi-spherical, smooth surface is formed. It appears that the film encasing the granulate elastically also effects an advantageous, very fine-grained foaming. The granulate diameter can be regulated via the size of the holes in the perforated plate. the diameter of the holes in the perforated plate can be selected such that the granulate has a diameter of 1 to 20 mm, and preferably 2 to 8 mm.

It is a complete surprise that an semi-spherical granulate with a smooth surface is obtained by foaming the molten material in a retarded manner in accordance with the invention. Experts in the professional field have previously been of the opinion that foaming the molten material as it leaves the perforated plate would cause the granulate formed to have a surface filled with crater-shaped fissures. The result of such a surface would be that a delayed cooling would ensue in the pilot phase during the foaming of the molten material such that an expanding agent could suddenly escape at the surface in this phase. The broken surface structure which is filled with crater-shaped fissures remains intact during the solidification of the molten material and is even reinforced by the slight shrinking of the material during its cooling.

By contrast, the immediate formation of a closed elastic film on molten material surface is attained in accordance with the invention by cooling said material in an immediately controlled manner. It has been clearly proven that the formation of a film with sufficient firmness already ensues simultaneously as the foaming of the molten material is begun. This has the effect that only small amounts of the expanding agent exits through the film formed in its hardening stage and a closed, smooth surface thus is formed. The film is even elastically expanded by the expanding agent being freed, in the process of which the closed, smooth surface remains intact in an advantageous manner and forms an semi-spherical granulate in addition.

The invention is to be explained below using examples.

EXAMPLE 1

A polypropylene block-copolymer with a melt-flow index M1=0.9, to which Hydrocerol (Boehringer Co.) is added as a nucleating agent, is processed in a single-screw extruder with a diameter of 90 mm. An isobutane with 6.2% of the polymer weight is added to the polypropylene block-copolymer as an expanding agent. The polymer is melted in the single-screw extruder and exits through the granulating machine perforating plate of an underwater granulating machine arranged at the outlet of the extruder. The granulating machine perforated plate is fitted with 80 holes with a diameter of 2.8 mm. The water flowing in the underwater granulating machine has a temperature of 53° C.; pressure amounts to 1 bar. The result is that a foamed, semi-spherical granulate with a smooth surface and a diameter of 3.5 to 7.5 mm is produced. The bulk density of the granulate amounts to 100 g/l. The melting temperature before the cutting tip amounts to 195° C.

EXAMPLE 2

A polypropylene block-copolymer with a melting index M1=0.54 is introduced together with Hydrocerol made by the Boehringer Company as a nucleating agent into a single-screw extruder with a screw diameter of 90 mm. Isobutane in a proportion of 15% of the polymer weight is added as an expanding agent. A perforated plate of an underwater granulating machine with 70 holes having a diameter of 1.5 mm is arranged at the outlet of the extruder. The polymer attains a temperature of 190° C. before the cutting tip and escapes into the flowing water of an underwater granulating machine which has a temperature of 65° C. The molten material is granulated there with a cutting device. The result is that foamed, semi-spherical particles with a diameter of 5 to 7 mm and a bulk density of 20 g/l are produced.

The foamed granulate obtained above is introduced into forms and sintered into molded parts. The molded forms have a smooth, closed surface by which the absorption of water is prevented and the mechanical stability increased. The smooth-surfaced, closed film which encases the foamed core of each granulate particle and which has been produced in accordance with the invention, forms honeycomb structures in the molded part which substantially increase the stability of the mold.

What is claimed is:

1. A method for producing a foamed granulate, wherein a thermoplastic synthetic material is fed into an extruder, the synthetic material is melted, a pressurized expanding agent is added through one or several injection nozzles, and the molten material which is enriched with the expanding agent foams as the molten material escapes through a perforated plate arranged at an outlet of the extruder and is granulated by a cutting device arranged behind the perforated plate, wherein the molten material from the perforated plate is cooled in a controlled manner and escapes into a flowing cooling medium, and wherein the temperature of the molten material, the temperature of the cooling medium as well as the pressure in the cooling medium are regulated so that the surface of the molten material immediately solidifies as the foaming molten material leaves the perforated plate in order to form a smooth, closed film with a thickness of 10 to 500 $\mu$m under which the foamed molten material is located, through which process a granulate is produced with a rounded surface and a bulk density of 10 to 600 g/l.

2. A method in accordance with claim 1, wherein the molten material escapes from the perforated plate into flowing water of an underwater granulating machine.

3. A method in accordance with claim 1, wherein a polypropylene is introduced into the extruder.

4. A method in accordance with claim 1, wherein the temperature of the cooling medium lies between 20° and 80° C.; the temperature of the molten material exiting the perforated plate is 100° to 300° C.; and wherein a pressure of 1 bar is active in a vicinity of the cooling medium.

5. A foamed granulate, produced according to the method in accordance with claim 1, wherein the granulate has a rounded, smooth-surfaced, closed surface film with a thickness of 10 to 500 $\mu$m, a bulk density of 10 to 600 g/l and a diameter of 1 to 20 mm.

6. A method in accordance with claim 1, wherein said closed film thickness is 20 to 200 $\mu$m.

7. A method in accordance with claim 4, wherein the temperature of the molten material exiting the perforated plate is 160° to 260° C.

8. A foamed granulate in accordance with claim 5, wherein the granulate surface film has said thickness of 20 to 200 $\mu$m.

9. A foamed granulate in accordance with claim 5, wherein the granulate has said diameter of 2 to 8 mm.

* * * * *